(12) United States Patent
Higgins

(10) Patent No.: US 8,556,327 B1
(45) Date of Patent: Oct. 15, 2013

(54) FUEL HOUSING ASSEMBLIES WITH INTEGRATED SEALING RETAINER ASSEMBLIES

(75) Inventor: Christopher Michael Higgins, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/428,570

(22) Filed: Mar. 23, 2012

(51) Int. Cl.
*B62D 25/00* (2006.01)

(52) U.S. Cl.
USPC ............................................. 296/97.22

(58) Field of Classification Search
USPC ...................................... 296/97.22
See application file for complete search history.

(56) References Cited

U.S. PATENT DOCUMENTS

| | | | |
|---|---|---|---|
| 4,474,393 A | 10/1984 | Kimura | |
| 4,682,513 A | 7/1987 | Reeder | |
| 4,917,418 A | 4/1990 | Gokee | |
| 5,044,678 A * | 9/1991 | Detweiler | 292/144 |
| 5,048,878 A | 9/1991 | Takeshita et al. | |
| 6,050,623 A * | 4/2000 | Martus et al. | 292/337 |
| 6,056,020 A | 5/2000 | Malone | |
| 6,142,035 A | 11/2000 | Babatz et al. | |
| 6,189,959 B1 * | 2/2001 | VanAssche et al. | 296/207 |
| 6,234,556 B1 * | 5/2001 | Janssen | 296/97.22 |
| 6,554,344 B2 | 4/2003 | Son | |
| 7,752,941 B2 | 7/2010 | Ruhlander | |
| 2012/0161462 A1 * | 6/2012 | Zentner | 296/97.22 |

* cited by examiner

*Primary Examiner* — Dennis Pedder
(74) *Attorney, Agent, or Firm* — Dinsmore & Shohl LLP

(57) ABSTRACT

A fuel housing assembly for a vehicle includes a fuel housing having sidewalls and an interior wall defining a fuel nozzle receiving volume for receiving a fuel nozzle. A sealing retainer assembly includes a retainer base integrally formed with the fuel housing and a seal member that engages a locking shaft of a fuel door lock system in both unlocked and locked configurations.

17 Claims, 4 Drawing Sheets

FUEL HOUSING ASSEMBLIES WITH INTEGRATED SEALING RETAINER ASSEMBLIES

TECHNICAL FIELD

The present specification generally relates to fuel housing assemblies for vehicles and, more particularly, to fuel housing assemblies that include integrated sealing retainer assemblies.

BACKGROUND

Fuel door lock systems are frequently used on current automobiles to inhibit opening of a fuel door and access to fuel within a vehicle fuel tank. There are a number of fuel door lock system types. As one example, a fuel door lock system may include a lock on the fuel door that can be opened using a key, such as the ignition key or a different key. As another example, a fuel door lock system may include the use of a striker fixed to the filler door and a lock member mounted to the vehicle body that is moveable between locked and unlocked positions, for example, using a release cable. Remotely actuated fuel door lock systems are also known where the fuel filler door can be unlocked by an operator remotely with electrically actuated release systems.

SUMMARY

In one embodiment, a fuel housing assembly for a vehicle includes a fuel housing having sidewalls and an interior wall defining a fuel nozzle receiving volume for receiving a fuel nozzle. A sealing retainer assembly includes a retainer base integrally formed with the fuel housing and a seal member that engages a locking shaft of a fuel door lock system in both unlocked and locked configurations.

In another embodiment, a vehicle includes a fuel door. A fuel door lock system includes a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door and a body panel. A fuel housing assembly includes a fuel housing that is connected to the body panel having sidewalls and an interior wall defining a fuel nozzle receiving volume for receiving a fuel nozzle. A sealing retainer assembly includes a retainer base integrally formed with the fuel housing and a seal member that engages the locking shaft of the fuel door lock system in both unlocked and locked configurations.

In another embodiment, a method of locking and unlocking a fuel door of a vehicle is provided. The method includes engaging a locking member of the fuel door within a fuel housing with a locking shaft of a fuel lock system providing a locked configuration. The locking member of the fuel door may be disengaged within the fuel housing with the locking shaft of the fuel lock system providing an unlocked configuration. The locking shaft is sealed against in both the locked and unlocked configurations using a sealing retainer assembly comprising a retainer base integrally formed with the fuel housing and a seal member that engages the locking shaft of the fuel door lock system in both the unlocked and locked configurations.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to fuel housing assemblies for vehicles that include integrated sealing retainer assemblies that seal against locking shafts of fuel door lock systems. The integrated retainer assemblies generally include a retainer base that is formed integrally with the fuel housing and a retainer cap that connects to the retainer base for housing a seal member therebetween. The seal member can engage the sliding locking shaft to provide a seal between the sealing retainer assemblies and the locking shafts of fuel door lock systems with the locking shafts in both their locked and unlocked configurations.

Figure 1:
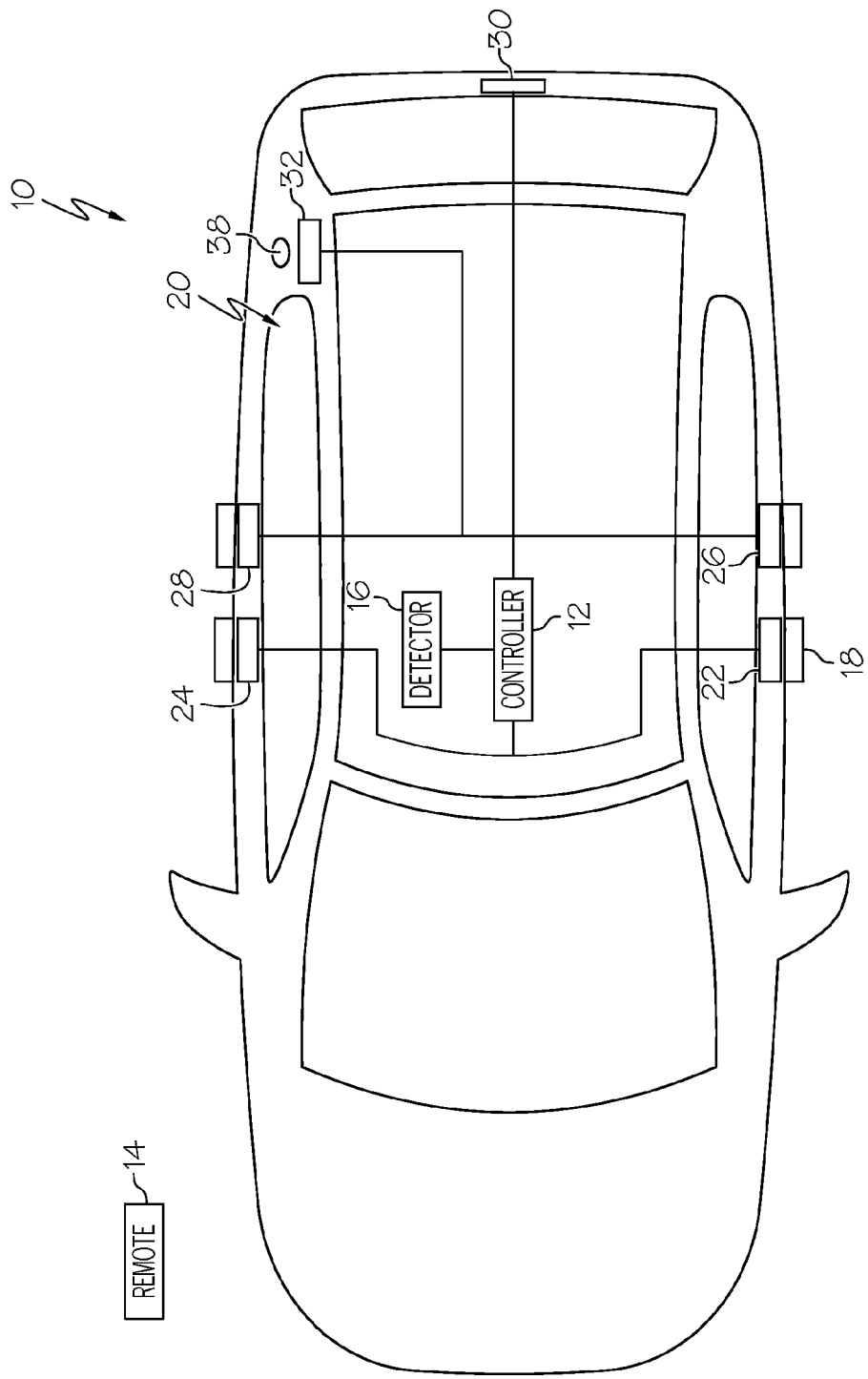
FIG. 1 is a schematic illustration of a vehicle including a controller and vehicle security system according to one or more embodiments described herein.

Referring to FIG. 1, a vehicle 10 includes a controller 12 that may communicate wirelessly with a remote lock control device 14 to determine whether a suitable lock or unlock signal has been received. The remote lock control device 14 may be, for example, a remote wireless key and/or a mobile device such as a personal digital assistant, a laptop computer, a cellular phone or some other mobile device. In some embodiments, the controller 12 may communicate with a detector 16 that detects actuation of a mechanical key inserted into a door lock 18 of the vehicle 10 or a user interface such as a keypad that provides a signal to the controller 12. The controller 12 may also look for other suitable signal sources such as from interior lock/unlock buttons within the vehicle 10. The controller 12 may operate a vehicle security system 20 based on an incoming lock or unlock signal from, for example, the remote lock control device 14 and/or the detector 16.

The vehicle security system 20 may include any number of door lock systems 22, 24, 26, 28, 30 and 32. For example, door lock systems may include a driver door lock system 22, a passenger door lock system 24, backseat door lock systems 26 and 28, a trunk or rear hatch lock system 30 and a fuel door lock system 32. The controller 12 may lock and unlock the various door lock systems 22, 24, 26, 28, 30 and 32 in any number of ways. For example, the controller 12 may energize and de-energize an electromechanical device, such as a solenoid to extend and retract a locking shaft to lock and unlock the door lock systems. In some embodiments, the controller 12 may control activation and rotation of an electric motor that drives a rack-and-pinion gear set that is connected to a locking shaft to extend and retract the locking shaft to lock and unlock the door lock systems.

In the embodiment of FIG. 1, the vehicle 10 is a car. In other embodiments, the vehicle may be a truck, a sport utility vehicle, a semi-tuck, a van, a boat, a plane or other vehicle types. In these embodiments, the locking and unlocking of other components using the controller may be desired. For example, for a truck, locking and unlocking of a tailgate may be provided using the controller. For a sport utility vehicle, locking and unlocking of a rear hatch may be provided using the controller.

In some embodiments, the door lock systems 22, 24, 26, 28, 30 and 32 may include the fuel door lock system 32 that is used to lock and unlock a fuel door 38 with the fuel door in a closed configuration. Once unlocked, the fuel door 38 may be manually openable and closable. The fuel door lock system 32 may be individually controllable, for example, using the remote lock control device 14 and/or the operation of the fuel door lock system 32 may be controlled by the controller 12 based on a lock/unlock signal for one or more of the other fuel door lock systems, such as the driver door lock system 22. Such fuel door lock systems 32 that operate with (or tied to) other door lock systems may be referred to as being "interlocked." That is, the fuel door lock system 32 may unlock when the driver door lock system 32 is unlocked and the fuel door lock system 32 may lock when the driver door lock system 22 is locked. Another example is for a van having a sliding rear door, the fuel door lock system may be interlocked with the sliding door lock system such that the fuel door locks when the sliding door is unlocked or opened to inhibit the sliding door colliding into the fuel door. Various other interlock examples are possible.

Figure 2:
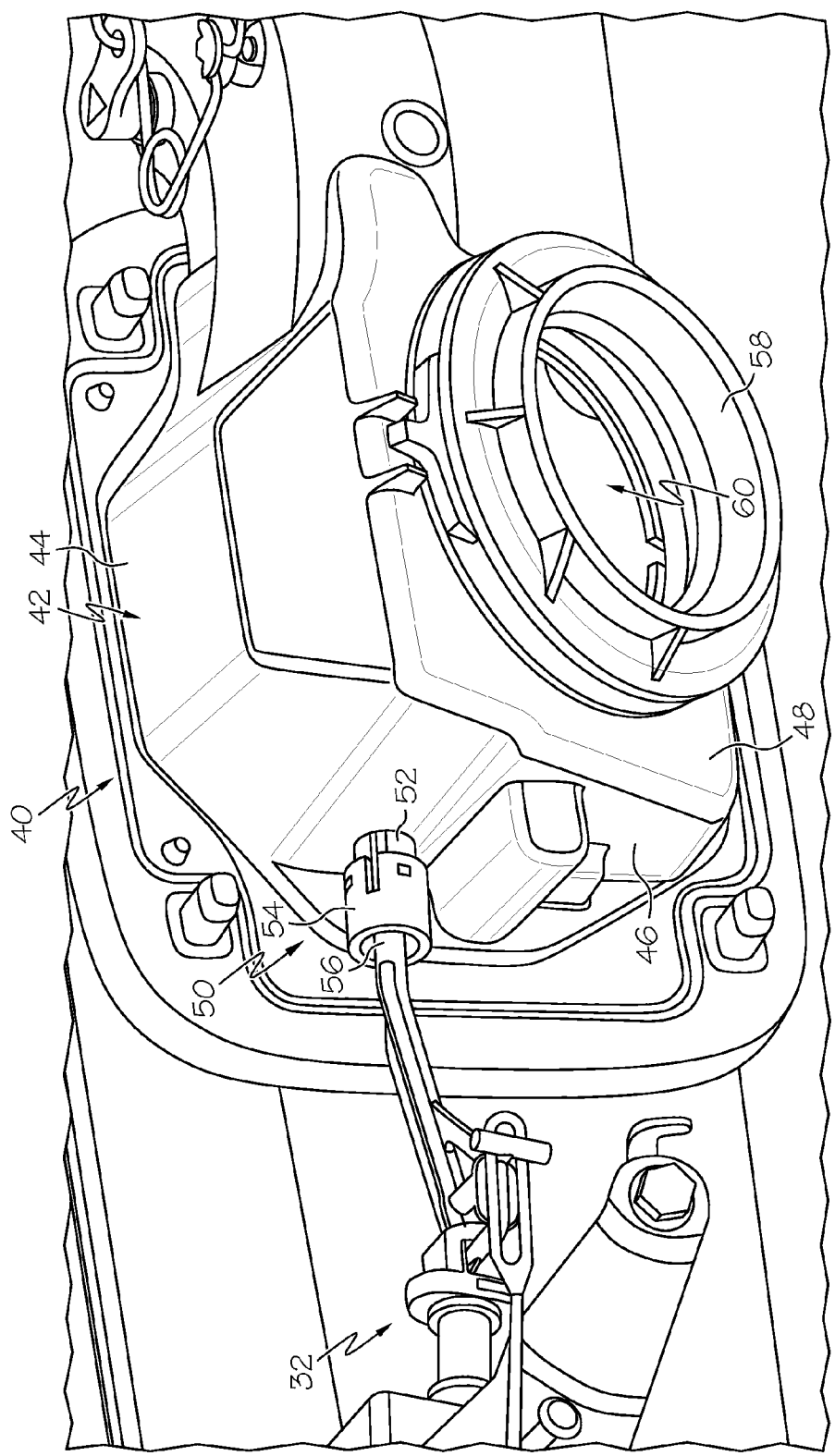
FIG. 2 is an interior view of a fuel housing assembly and fuel door lock system according to one or more embodiments described herein.

Referring to FIG. 2, an interior view of a fuel housing assembly 40 from within the vehicle 10 is illustrated. The fuel housing assembly 40 includes a fuel housing 42 having a top wall 44, sidewalls 46 and an interior wall 48 defining a fuel nozzle receiving volume. A sealing retainer assembly 50 is provided at a sidewall 46 of the fuel housing 40. The sealing retainer assembly 50 includes a retainer base 52 and a retainer cap 54 that receives a locking shaft 56 of the fuel door lock system 32. In other embodiments, the sealing retainer assembly 50 may not include the retainer cap. A fuel housing grommet 58 is provided at a fuel filling opening 60 of the fuel housing 42. The fuel housing grommet 58 can threadably receive a fuel filling cap or a fuel filling pipe.

Figure 3:
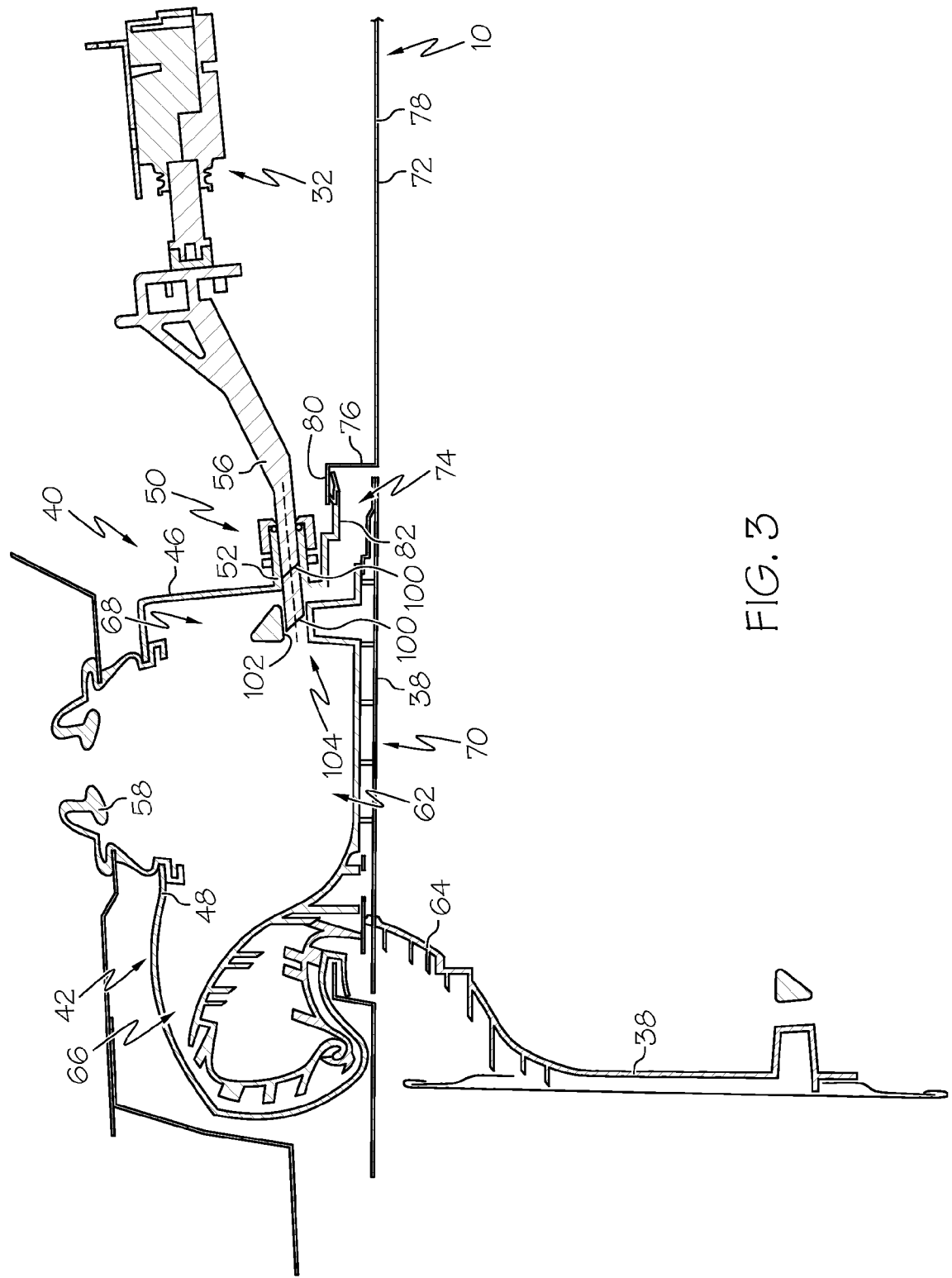
FIG. 3 is a section view of the fuel housing assembly of FIG. 2.

Referring to FIG. 3, a section view of the fuel housing assembly 40 includes the fuel housing 42 including the sidewalls 46 and the interior wall 48 defining the fuel nozzle receiving volume 62. The fuel housing grommet 58 is received by the interior wall 48 providing a location for inserting a fuel pipe. The fuel door 38 is connected to the fuel housing 42 by a hinge and spring component 64. The hinge and spring component 64 can bias the fuel door 38 toward the fully open position when in the fully open position and toward the fully closed position when in the fully closed position. The fuel door 38 may be placed in the fully open and fully closed positions by grasping the fuel door 38 and moving the fuel door 38 manually. The hinge and spring component 64 may provide an opening force to open the fuel door 38 or there may be no spring component applying a biasing force, only a hinge.

The fuel housing 42 may be somewhat irregular in shape having a front section 66 that is shaped to accommodate the hinge and spring component 64 and a rear section 68 that receives the locking shaft 56 of the fuel door lock system 32. It should be noted that the fuel housing assembly 40 may be located at any suitable location on the vehicle 10, such as the front, rear, diver's side or passenger's side. Further, the fuel door 38 may open in a number of ways, such as rear-to-front or front-to-rear. The fuel housing 42 may be connected to the vehicle 10 using any suitable connection. In the illustrated embodiment, the fuel housing 42 is secured within an aperture 70 of a body panel 72 of the vehicle 10. The body panel 72 may be formed of a sheet metal which has a pocket 74 for accepting the fuel housing 42.

In some embodiments, the pocket 74 of the body panel 72 includes an inwardly extending wall portion 76 that extends in the vehicle widthwise direction from an outer facing portion 78 of the body panel 72 and a frontward extending wall portion 80 that extends in the vehicle lengthwise direction from the inwardly extending wall portion 76. The fuel housing 42 may include a connecting portion 82 that connects to the frontward extending portion 80 of the body panel 72 for securing the fuel housing 42 to the body panel 72. Any suitable connecting structure may be used for connecting the fuel housing 42 to the body panel 72, such as clips, fasteners, clamps and the like.

The sealing retainer assembly 50 is provided at the sidewall 46 of the fuel housing 42. The sealing retainer assembly 50 includes the retainer base 52 that receives the locking shaft 56 of the fuel door lock system 32. The retainer base 52 is formed integrally with the fuel housing 42 and extends outwardly from an outer surface of the sidewall 46 in the lengthwise direction of the vehicle 10. In one embodiment, the retainer base 52 may be molded integrally with the fuel housing 42 so that the retainer base 52 and the fuel housing 42 are a single component.

Figure 4:
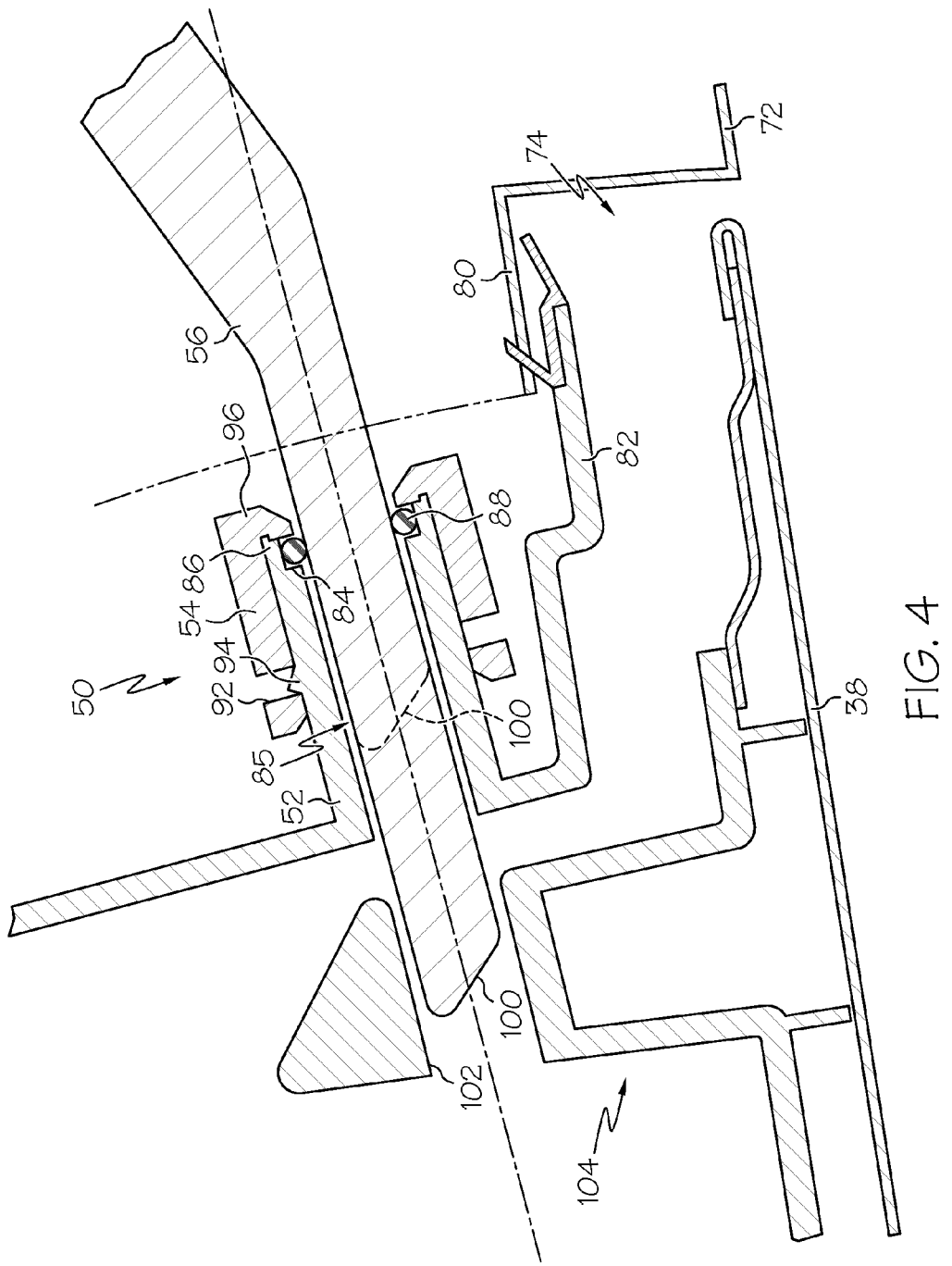
FIG. 4 is a detail view of the fuel housing assembly of FIG. 3.

Referring to FIG. 4, in some embodiments, the retainer base 52 is tubular in shape and includes a bore 85 extending therethrough that slidably receives the locking shaft 56. A seating surface 84 may be provided at a terminal end 86 of the retainer base 52 for receiving a seal member 88, such as an o-ring seal. Retaining the seal member 88 on the seating surface 84 is the retainer cap 54. The retainer cap 54 may be slidably received on the retainer base 52. In some embodiments, the retainer cap 54 may include an opening or notch 92 that can receive a projection 94 formed on an outer surface of the retainer base 52. Other suitable connections may be used for the retainer base 52 and the retainer cap 54 such as a threaded connection, friction fit, etc. The retainer cap 54 includes an overhang portion 96 that overhangs the seating surface 84 to provide a seal receiving volume for housing the seal member 88. In some embodiments, the retainer cap 54 may provide a compressive force against the seal member 88. In other embodiments, the retainer cap 54 may not provide a compressive force against the seal member 88. The retainer base 52, in some embodiments, may compress the seal member 88 radially. The seal member 88 engages the locking shaft 56 in both its extended (i.e., locked) position and retracted (i.e., unlocked) position. In other embodiments, the sealing retainer assembly 50 may not include the retainer cap. For example, the seal member 88 may be co-injected on the retainer base 52.

As can be seen, the retainer base 52 terminates forward of the of the frontward extending wall portion 80 of the body panel 72. In these embodiments, the connecting portion 82 of the fuel housing 42 may extend rearward a greater distance than the retainer base 52. Such an arrangement can facilitate installation of the fuel housing 42 including the retainer base 52 into the pocket 74 of the body panel 72 and can also limit interference between the retainer base 52 and the retainer cap 54 with other nearby components within the vehicle 10.

FIGS. 3 and 4 also illustrate operation of the sealing retainer assembly 50 with integral retainer base 52, retainer cap 54 and seal member 88. With the locking shaft 56 in its extended or locked position, a locking end 100 of the locking shaft 56 is received within an lock opening 102 of a locking member 104 connected to the fuel door 38. The locking shaft

56 may have a width that is slightly greater than an inner diameter or width of the seal member 88 (with the seal member 88 in a compressed and/or uncompressed state) such that the seal member 88 engages the locking shaft 56 in the locked position to provide a seal between the seal member 88 and the locking shaft 56. With the locking shaft 56 in its retracted or unlocked position, the locking end 100 of the locking shaft 56 is retracted into the retainer base 52, removed from the lock opening 102 of the locking member 104. The locking shaft 56 may have a width that is slightly greater than the inner diameter or width of the seal member 88 such that the seal member 88 engages the locking shaft 56 in the unlocked position to provide a seal between the seal member 88 and the locking shaft 56.

The above-described sealing retainer assemblies provide a retainer base that is formed integrally with the fuel housing instead of being a component that is separately attached to the fuel housing. Such an integral arrangement can reduce complications when installing the fuel housing assembly and the fuel door lock system. Additionally, providing the sealing arrangement of the sealing retainer assemblies allows for sealing against the locking shaft of the fuel door lock system in both the locked configuration and the unlocked configuration, which can reduce any leakage through the sealing retainer assemblies when the fuel door is in the open or closed positions. While the sealing retainer assemblies are illustrated above in the context of a fuel housing assembly, the sealing retainer assemblies may be used with other assemblies, such as an electric car charging port door for an electric vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fuel housing assembly for a vehicle, comprising:
a fuel housing having sidewalls and an interior wall defining a fuel nozzle receiving volume for receiving a fuel nozzle; and
a sealing retainer assembly comprising a retainer base integrally formed with the fuel housing and a seal member that engages a locking shaft of a fuel door lock system in both unlocked and locked configurations;
wherein the retainer base is integrally molded with the fuel housing.

2. The fuel housing assembly of claim 1, wherein the retainer base includes a seating surface that receives the seal member.

3. The fuel housing assembly of claim 2, wherein the sealing retainer assembly further comprises a retainer cap that receives the seating surface and the seal member therein.

4. The fuel housing assembly of claim 3, wherein the seal member is an o-ring having an inner diameter that is less than a width of the locking shaft.

5. The fuel housing assembly of claim 4, wherein the seal member is compressed between the retainer cap and the retainer base.

6. The fuel housing assembly of claim 1, wherein the retainer base extends integrally outward from one of the sidewalls.

7. A vehicle comprising:
a fuel door;
a fuel door lock system comprising a locking shaft having a locked configuration where a locking end of the locking shaft engages a locking member of the fuel door to inhibit opening of the fuel door and an unlocked configuration where the locking end of the locking shaft is removed from the locking member to allow opening of the fuel door;
a body panel; and
a fuel housing assembly comprising:
a fuel housing connected to the body panel having sidewalls and an interior wall defining a fuel nozzle receiving volume for receiving a fuel nozzle; and
a sealing retainer assembly comprising a retainer base integrally formed with the fuel housing and a seal member that engages the locking shaft of the fuel door lock system in both unlocked and locked configurations;
wherein the retainer base is integrally molded with the fuel housing.

8. The vehicle of claim 7, wherein the body panel includes a frontward extending portion that extends in the vehicle lengthwise direction, the fuel housing including a connecting portion that connects to the frontward extending portion of the body panel.

9. The vehicle of claim 8, wherein the connecting portion of the fuel housing extends outwardly beyond the retainer base.

10. The vehicle of claim 7, wherein the retainer base includes a seating surface that receives the seal member.

11. The vehicle of claim 10, wherein the sealing retainer assembly further comprises a retainer cap that receives the seating surface and the seal member therein.

12. The vehicle of claim 11, wherein the seal member is an o-ring having an inner diameter that is less than a width of the locking shaft.

13. The vehicle of claim 12, wherein the seal member is compressed between the retainer cap and the retainer base.

14. The vehicle of claim 7, wherein the retainer base extends integrally outward from one of the sidewalls.

15. The vehicle of claim 7 wherein the fuel door lock system comprises an actuator that moves the locking shaft between the locked configuration and the unlocked configuration.

16. A method of locking and unlocking a fuel door of a vehicle, the method comprising:
engaging a locking member of the fuel door within a fuel housing with a locking shaft of a fuel lock system providing a locked configuration;
disengaging the locking member of the fuel door within the fuel housing with the locking shaft of the fuel lock system providing an unlocked configuration; and
sealing against the locking shaft in both the locked and unlocked configurations using a sealing retainer assembly comprising a retainer base integrally formed with the fuel housing and a seal member that engages the locking shaft of the fuel door lock system in both the unlocked and locked configurations;
wherein the retainer base is integrally molded with the fuel housing.

17. The method of claim 16 further comprising compressing the seal member at the retainer base.

* * * * *